United States Patent [19]

Hawkins

[11] 4,195,703
[45] Apr. 1, 1980

[54] UNIVERSALLY STEERABLE VEHICLE

[76] Inventor: William L. Hawkins, Box 457, Malin, Oreg. 97632

[21] Appl. No.: 916,711

[22] Filed: Jun. 19, 1978

[51] Int. Cl.² ............................................. B62D 57/00
[52] U.S. Cl. ..................................................... 180/7 R
[58] Field of Search ................... 180/7 R, 8 R; 74/84, 74/88, 126, 574; 298/1 V; 214/64.2; 46/1 C

[56] References Cited

U.S. PATENT DOCUMENTS 3,196,580  7/1965  Rakestraw ........................... 180/7 R

FOREIGN PATENT DOCUMENTS 1145460  10/1957  France ........................................ 46/1 C Primary Examiner—John J. Love
Assistant Examiner—Randall A. Schrecengost
Attorney, Agent, or Firm—Clarence M. Crews

[57] ABSTRACT

This invention relates to an universally steerable, ridable vehicle which may be designed for a variety of purposes, ranging from a child's toy to an automotive vehicle operable on a highway. The steering capability of a conventional, wheel supported automotive vehicle and the unavoidable limitations of that capability are well understood. The present vehicle, from a standing start, can be propelled in any chosen direction, forward, rearward, directly sidewise, or in any chosen oblique direction forward or backward relative to the direction in which the vehicle is pointed. It can also be steered like a conventional vehicle.

4 Claims, 7 Drawing Figures

UNIVERSALLY STEERABLE VEHICLE

This invention relates to a novel ridable automotive vehicle which, in place of the conventional driving and steering wheels, is supported on a multiplicity of normally parallel vibratory, vertical but tiltable rods or legs.

The vehicle includes a body which may carry a driver's seat, a multiplicity of body connected, vehicle supporting rods reciprocated up and down lengthwise in unison by a motor, and a shiftable steering structure through which all the body connected supporting rods normally pass in parallelism, either vertically or at a desired uniform slant.

When the propelling and steering rods extend vertically and the motor is running, the rods are reciprocated vertically and the vehicle stands still when the steering frame is shifted forwardly, laterally or rearwardly, the rods assume controlled, tilted attitudes and their downward thrusts impart lateral, rearward or forward movement, or a combination of forward or rearward with right or left movement, to the vehicle. Tilting of the steering column will tilt all of the rods in parallelism, causing the vehicle to progress in the direction in which the steering column is tilted.

Other objects and advantages will hereinafter appear.

In the drawing forming part of this specification,

Figure 1:
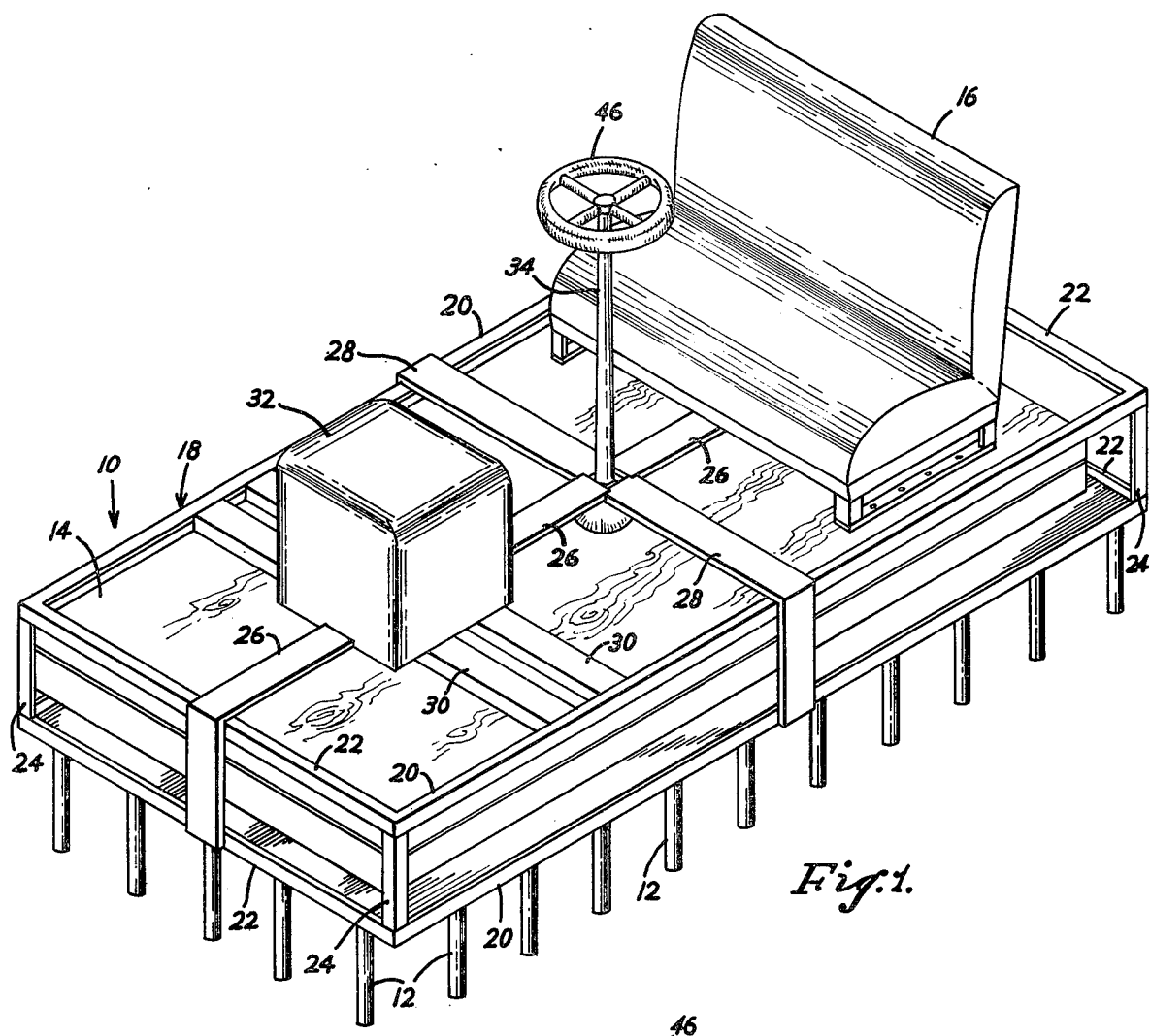
FIG. 1 is a perspective view of what may be the ridable vehicle in its entirety, the inclusion of a body enclosure being optional.

My novel vehicle 10 is supported in its entirety by ground or road engaging rods 12 which are of equal length and normally extend vertically downward from a body 14 on which a seat 16 is fixedly mounted, the seat shown being wide enough to accommodate a driver and two passengers.

A rigid steering frame 18 comprises upper and lower, fore-and-aft extending side bars 20, front and rear, upper and lower crossbars 22, and vertical corner bars 24. The steering frame also includes fore-and-aft extending angle bars 26 and crosswise extending angle bars 28.

Spaced parallel crossbars 30 extend between the bars 20,20 and contribute to the support of a vibratory motor 32, which may desirably be of the internal combustion type. Whenever the motor is running it imparts vertical vibration to the body 14, from which body the ground engaging rods 12 normally extend vertically downward.

So long as the ground is level and the rods 12 extend vertically downward the rods are simply oscillated vertically by the body 14 and impart no translatory motion to the vehicle. The frame members 26,26 and 28,28 terminate in close proximity to a control handle 34, which handle extends upward in convenient proximity to the operator's seat 16.

The carrier 14 of the rods 12 consists of four layers, to-wit: a top layer 14a of plywood, an urethane layer 14b, a fiber glass layer 14c, and an urethane layer 14d in which the upper ends of the rods 12 are embedded.

Each rod 12 is desirably of a composite structure. It comprises an upper solid end portion 12a of live rubber which fits securely in the plate member 14d. The solid portion is substantially coterminous with the lower face of the member 14d. Below that level a hollow portion 12b extends down to approximately the level of a plate 36. Each rod portion 12b terminates at substantially the level of the plate 36 and is surrounded at its lower end by a lump 36 of elastic material, desirably silicon rubber. Each lump 36a of silicon rubber fits securely into an opening provided in the plate 36 and is bonded to the plate. It is also bonded to the lower end of the rod portion 12b, and surrounds the upper end of a hollow rod portion 12c. The hollow rod portions 12c are desirably coterminous at their lower, road engaging ends.

So long as the rods 12 extend straight up and down and the ground is level, the vibration of the rods by the motor 32 is strictly vertical and no movement of the vehicle results.

Displacement of the handle 34 in a forward direction, however, will cause the rods 12 to be tilted, and in this situation the reciprocation of the rods by the motor 32 causes the vehicle to be propelled in a forward direction.

Similarly, displacement of the handle 34 to the rear will cause the vehicle to move backward, displacement of the handle to the right will cause the vehicle to move to the right, and displacement of the handle to the left will cause the vehicle to be moved to the left.

The vehicle is not restricted to movements in the precise directions referred to above but any movement constituting a combination of front or back with right or left may be had simply by moving the handle 34 in the desired oblique direction.

Figure 2:
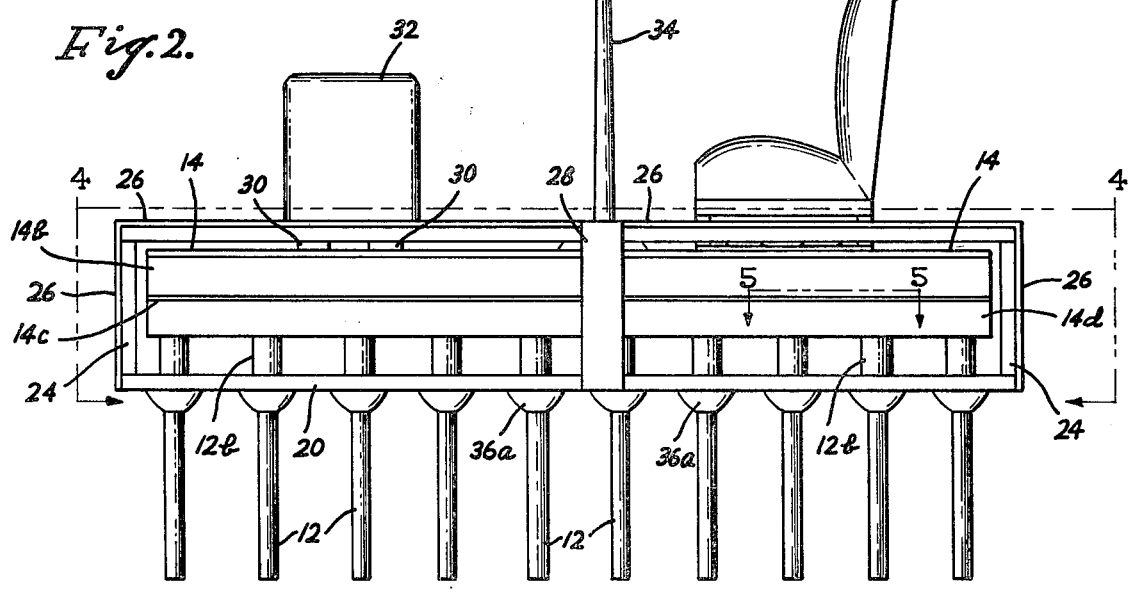
FIG. 2 is a view in side elevation of the vehicle illustrated in FIG. 1.
Figure 3:
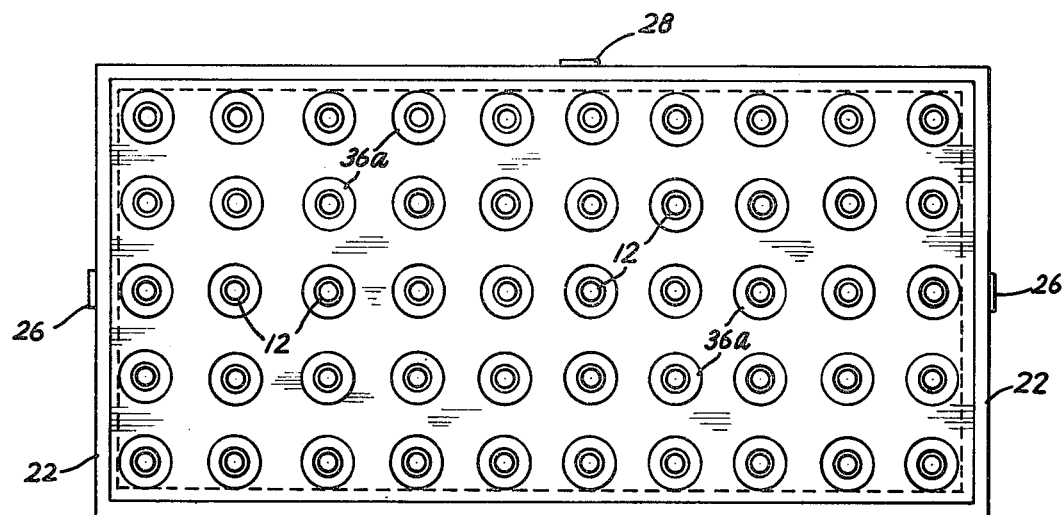
FIG. 3 is a plan view of the steering plate and associated parts.
Figure 4:
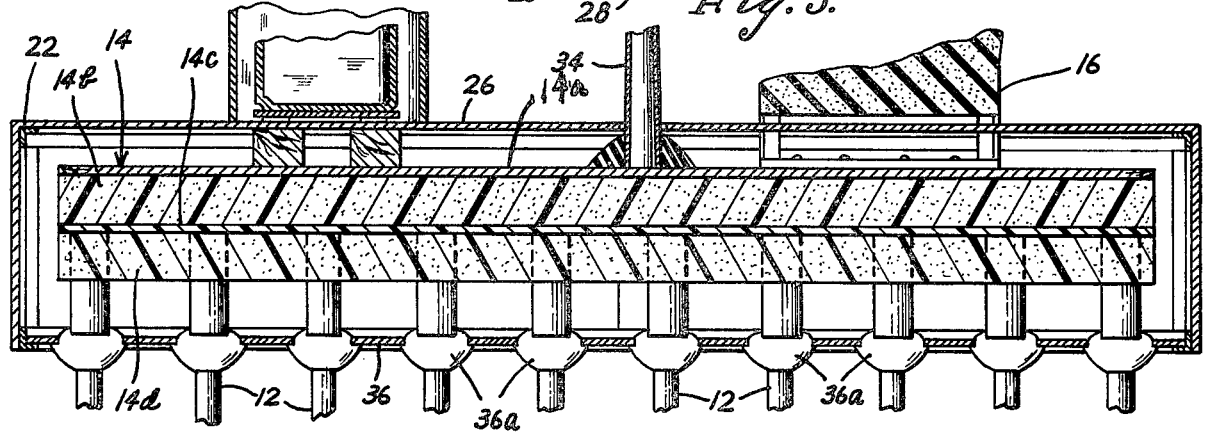
FIG. 4 is a vertical sectional view taken upon the line 4—4 of FIG. 2.
Figure 5:
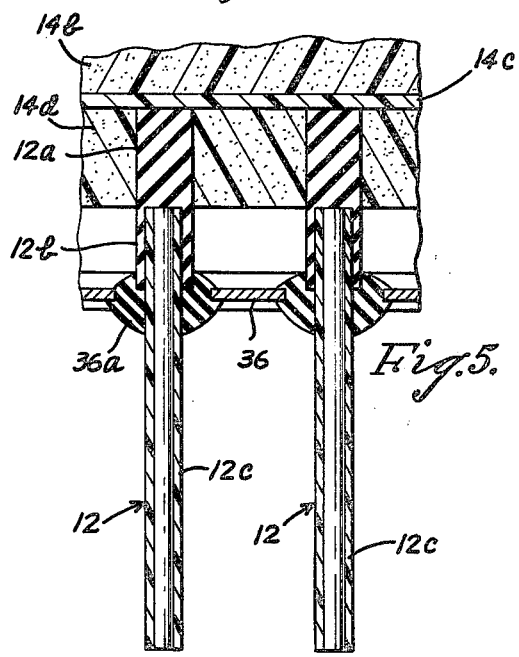
FIG. 5 is a vertical sectional view taken within the limits indicated by the arrow 5—5 in FIG. 2.
Figure 6:
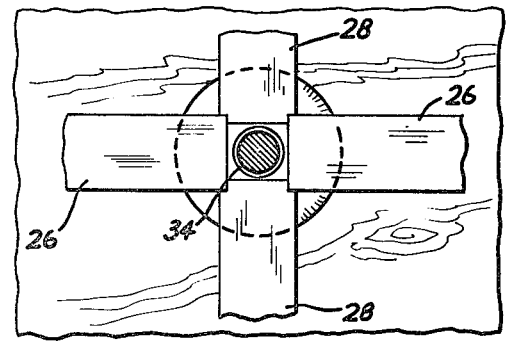
FIG. 6 is a fragmentary plan view showing the relation of the steering column to the vehicle body and to the means through which vibration is imparted to the supporting, propelling and steering rods.
Figure 7:
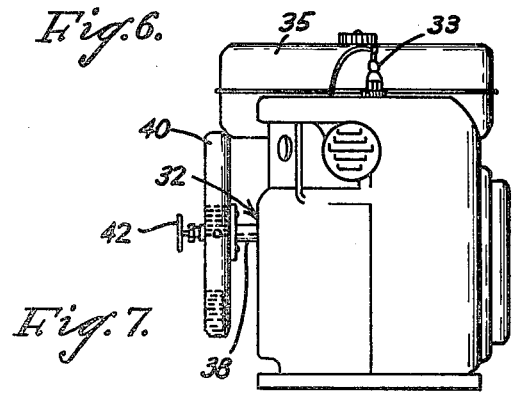
FIG. 7 is a detail view of a driving motor.

The motor 32 for vibrating up and down the frame 18 and the rods 12 carried by the frame, is an internal combustion motor operated at a desired, controlled speed by the driver. Since internal combustion motors of various designs are well understood, for illustrative purposes a single cylinder motor 32, fired by a single sparkplug 33, is shown illustratively in FIGS. 1, 2, 4 and 7.

The motor is supplied with liquid fuel from a tank 35 and has an output shaft 38 on which a tube 40, partially filled with mercury, is affixed. The mercury contained in the tube or shaft does not move from end to end of the tube when the shaft is in motion. Once the shaft is turning the mercury is held at the ends of the tube by centrifugal force. Adjusting more mercury from one end of the tube to the other by means of the valve handle 42 creates an imbalance and hence imparts more or less vibration to the machine. Starting with enough mercury to completely fill one end of the hollow shaft, adjustment to maintain one end full and other empty will produce the maximum vibratory stroke. By stopping the shaft from turning, opening the valve, and letting some of the mercury drain into the empty end, the stroke would be lessened. If a point of equal distribution of mercury is attained no vibration will result. In this manner, the means to control the torque of the vibration with the speed of the motor is available. Each change of torque in the vibration results in changing the length of travel on the propelling rods.

The tube 40 may be chosen of any suitable diameter and length depending on the nature and use of the particular vehicle.

It will be apparent that the vehicle can be driven directly forward, backward, to either side and at any chosen oblique angle.

For highway use it would be important for the operator to twist the handle 34 for turning the vehicle. A steering wheel 46 affixed to the handle 34 will enable the operator to turn the vehicle at a street corner and then to straighten it out in the new direction that it is pointed.

I have described what I believe to be the best embodiment of my invention. What I desire to cover by letters patent, however, is set forth in the appended claims.

I claim:
1. A ridable automotive vehicle which comprises
   (a) a body,
   (b) a multiplicity of normally parallel, tiltable body supporting and driving rods that extend downward from the body,
   (c) a steering frame on the body operable to tilt the rods in various chosen directions, said rods being resiliently connected to the steering frame intermediate their ends and resiliently connected to the body at their upper ends,
   (d) a motor supported on the steering frame,
   (e) means responsive to the motor causing the rods, tilted or vertical, to be reciprocated up and down; and
   (f) a steering lever on the body operable to shift the steering frame fore-and-aft and/or sidewise, for simultaneously shifting the slant of all the vehicle supporting rods identically or selectively, and to shift the steering frame rotatively, thereby to tilt the rods selectively for enabling the rider to cause the rods to turn the vehicle right or left, or to drive the vehicle directly forward, directly backward, or directly in any other chosen direction.

2. An automotive vehicle as set forth in claim 1 in which the rods are connected to the steering frame intermediate their ends through balls of rubber and to the body at their upper ends through inserts of rubber.

3. An automotive vehicle as set forth in claim 1 in which the steering wheel is provided for twisting the steering frame relative to the body, thereby to reorient the body.

4. An automotive vehicle as set forth in claim 1 in which the motor includes an output shaft and a tube that extends transversely of the shaft and is driven by the shaft, being partially filled with mercury and including valve means for adjusting and maintaining a desired imbalance of the mercury in the tube, relative to the axis of the shaft.

* * * * *